Feb. 20, 1923.
H. E. RHOADS.
MEANS FOR PREVENTING THE ESCAPE OF LUBRICANT FROM CASINGS.
FILED MAR. 5, 1921.
1,446,068.
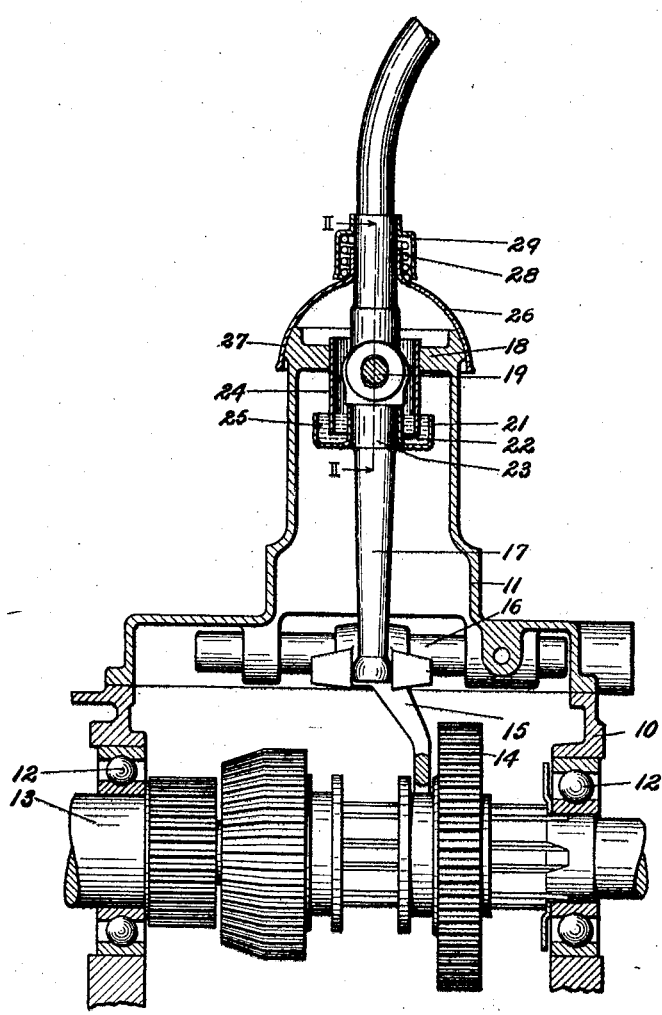
Fig. I.
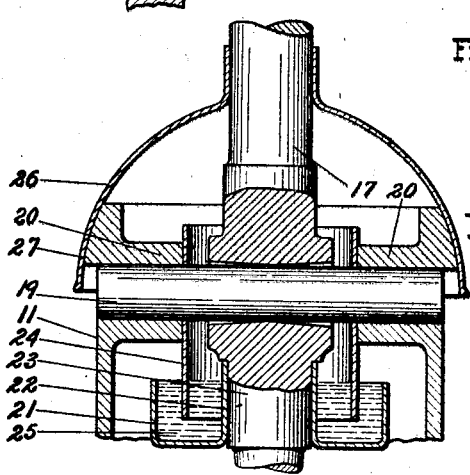
Fig. II.
INVENTOR.
Harry E. Rhoads
BY Chester H. Braselton
Harry W. Lindsey Jr.
ATTORNEYS Patented Feb. 20, 1923.

1,446,068

UNITED STATES PATENT OFFICE.

HARRY E. RHOADS, OF TOLEDO, OHIO, ASSIGNOR TO THE WILLYS-OVERLAND COMPANY, OF TOLEDO, OHIO, A CORPORATION OF OHIO.

MEANS FOR PREVENTING THE ESCAPE OF LUBRICANT FROM CASINGS.

Application filed March 5, 1921. Serial No. 449,942.

*To all whom it may concern:*

Be it known that I, HARRY E. RHOADS, residing at Toledo, in the county of Lucas and State of Ohio, have invented certain new and useful Improvements in Means for Preventing the Escape of Lubricant from Casings, of which I declare the following to be a full, clear, and exact description.

My invention relates to means for preventing the escape of lubricant from casings and has for its object to provide improved means of this character which is applicable to transmission gear casings and other forms of housings inclosing various types of mechanism which move in oil or lubricant or are lubricated by having the oil splashed thereon or otherwise conveyed thereto.

A further object of the invention is to provide improved means for sealing an opening in the wall of a casing into which projects a movably mounted work performing member whereby the escape of lubricant or other liquids from the casing through said opening is prevented.

A further object of the invention is to provide a transmission gear shift mechanism including a housing therefor and an operating member projecting therein, with improved means for sealing the opening in the wall of the housing through which the operating member projects, whereby lubricating material within the housing is prevented from escaping through said opening.

With these and other objects in view, the invention comprises certain improved forms of construction, arrangement of parts and combination of elements which will be hereinafter more fully described and claimed, it being understood that the present showing is intended to illustrate one form of the invention which is susceptible of various modifications to suit special or varying conditions, and it will be further understood that the terms which I have used are merely descriptive and not limiting and that it is my intention to include any and all modifications which come within the scope of the invention as defined by the appended claims.

In the accompanying drawings I have illustrated one embodiment of the invention in which:

Figure I is a sectional elevation embodying the invention.

Figure II is a fragmentary sectional elevation taken on line II—II of Figure I.

In the driving of motor vehicles it has been found that considerable lubricating material escapes from time to time from the transmission gear shift casing through the opening in the extension thereof in which is mounted the gear shift lever. This is an objectionable feature which the present invention is designed to overcome and improved means has been provided for sealing the opening through which the lever projects whereby the escape of oil from the casing is prevented, and the possibility of damaging the wearing apparel of the occupants of the vehicle is thus avoided.

Referring to the drawings, 10 represents the housing or casing for the transmission gear shift mechanism, said housing being provided with an extension 11 which may be considered as a part of the housing and which is preferably removably mounted upon the portion 10 of the housing as shown in Figure I. The housing is provided with suitable bearings 12 for supporting the transmission shaft 13 having the usual driving gears thereon, and the sliding gear 14 adapted to be moved by means of the fork 15 slidably mounted upon the rod 16, the fork being moved by means of the gear shift lever 17 projecting into the housing through the end wall 18 of the extension 11 as shown in Figure I. The lever is pivoted within the housing upon the pin 19, the opposite ends of which are supported by the bearings 20 formed in the end wall of the housing as indicated in Figure II. The pin 19 is adapted to be driven out to permit the lever 17 to be withdrawn from the housing from time to time. The lever is provided at a point below the pivot 19 with a cup or container 21 having an inwardly extending tubular portion 22 which is adapted to be forced upon the enlarged portion 23 of the lever under pressure, whereby the cup is securely held upon the lever. Projecting into the cup 21 in spaced relation to the walls there is an open ended tubular member or sleeve 24, the upper end of which is suitably connected with the end wall 18 of the extension 11 and preferably projected through the opening therein, said sleeve being of a larger diameter than the diameter of the rod or lever 17 to permit of the desired amount of movement of the latter upon its pivot. The sleeve is also adapted to be supported by the pin 19 which extends transversely through the same as shown in Figure II. The cup 21 is substantially filled with any suitable yieldable substance, preferably a liquid as shown at 25, although other material may be used, such as a number of relatively small objects, as for instance shot, or like material which will be readily displaced upon movement of the lever, the object being the use of any suitable material which will serve to seal the lower end of the tubular member or which will tend to prevent the escape of lubricating material from the casing through the opening in the extension thereof. It will be understood that the only escape for the lubricant from the casing is through the cup 21 and that any lubricant which may be thrown to the top of the extension 11, in order to escape therefrom, must first pass into the cup and when the latter is filled any additional lubricant supplied thereto will overflow into the casing, whereby the escape of the lubricant through the end wall of the casing is prevented. The extension 11 is provided with a cover 26 carried by the rod or lever 17 to protect the open end of the tubular member 24, the cover being yieldably held in engagement with the annular curved surface 27 of the extension by means of a spring 28 positioned within the inverted cup-like member 29 secured upon the lever by any suitable means.

While I have illustrated and described one embodiment of my invention, it will be obvious that different modifications thereof may be constructed to suit different conditions, and I wish therefore not to be restricted or limited to the precise embodiment shown except in so far as the same is limited by the appended claims.

What I claim as new and desire to secure by Letters Patent is:

1. In a device of the class described, a casing having an opening therein, a work performing member projecting into the casing through said opening, and a container movable with the work performing element and having a substance therein affording a seal for said opening.

2. In a device of the class described, a transmission gear housing, a gear shift member projecting into the housing through an opening in the wall thereof, and a container carried by said member and having a substance therein affording a seal for said opening.

3. In a device of the class described, a transmission gear housing, a gear shift member projecting into the housing through an opening in the wall thereof, and a cup carried by said gear shift member, and having an opening through which the said member projects, said cup having a substance therein affording a seal for said opening.

4. In a device of the class described, a transmission gear housing, a gear shift member projecting into the housing through an opening in the wall thereof, a container carried by said member within the housing, and a sleeve-like member secured upon the housing and extending from said opening into the container, said container having a substance therein affording a seal for said opening.

5. In a device of the class described, a transmission gear housing, a gear shift member projecting into the housing through an opening in the wall thereof, a cup having a central opening through which said gear shift member projects the cup being secured upon and movable with the gear shift member, and a stationary tubular member projecting from said opening downwardly within said cup in spaced relation to the walls thereof, the cup having a substance therein affording a seal for said opening.

6. In a device of the class described, a transmission gear housing having an extension thereon, the end wall of which is provided with an opening therein, an open-ended tubular member secured in said opening and projecting into said extension, a gear shift member projecting into said extension through said tubular member in spaced relation to the walls thereof, and a container carried by and surrounding said gear shift member adapted to receive the lower end of said tubular member, said container having a substance therein affording a seal for said tubular member.

7. In a device of the class described, a transmission gear housing having an extension thereon, the end wall of which is provided with an opening therein, an open-ended tubular member secured in said opening and projecting into said extension, a gear shift lever projecting into the extension through said tubular member in spaced relation to the walls thereof, a pivot pin extending through said lever and through said tubular member and having its ends supported by said extension, and a container upon said lever adapted to receive the lower end of said tubular member, said container being movable with the lever and having a substance therein affording a seal for the tubular member.

8. In a device of the class described, a transmission gear housing having an extension thereon, a gear shift member projecting into said extension through an opening in the end wall thereof, a container carried by said member within said extension and having a substance therein affording a seal for said opening, and a cover for the outer end of the extension through which said gear shift member is adapted to project.

9. In a device of the class described, a transmission gear housing having an extension thereon, the end wall of which is provided with an opening therein, an open-ended tubular member projecting downwardly into the extension from said opening, a gear shift member projecting into said extension through said tubular member in spaced relation to the walls thereof, a container carried by said gear shift member adapted to receive the lower end of said tubular member, said container having a substance therein affording a seal for the tubular member, and a cover upon the outer end of the extension through which said gear shift member projects, said cover being adapted to protect the open end of said tubular member.

10. In combination, a gear shift mechanism including a housing and an operating member for the mechanism projecting through an opening in the wall of the housing, and a container carried by said operating member and having a substance therein affording a seal for said opening to prevent the escape of lubricating material supplied to said mechanism.

11. In combination, a gear shift mechanism including a housing and an operating member for the mechanism projecting through an opening in the wall thereof, a container carried by said operating member and having a substance therein affording a seal for said opening, and a cover upon the housing movable with said operating member and serving to protect said opening.

In testimony whereof I affix my signature.

HARRY E. RHOADS.